US011135934B2

(12) United States Patent
Smith

(10) Patent No.: US 11,135,934 B2
(45) Date of Patent: Oct. 5, 2021

(54) VEHICLE POWER DEVICES, SYSTEMS, AND METHODS FOR SLEEP MODE

(71) Applicant: NIO USA, Inc., San Jose, CA (US)

(72) Inventor: Alexander J. Smith, Saratoga, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/563,630

(22) Filed: Sep. 6, 2019

(65) Prior Publication Data

US 2021/0070191 A1    Mar. 11, 2021

(51) Int. Cl.
| | |
|---|---|
| *B62D 21/12* | (2006.01) |
| *B62D 21/11* | (2006.01) |
| *B60K 1/04* | (2019.01) |
| *B60L 53/62* | (2019.01) |
| *H02M 3/155* | (2006.01) |
| *B60L 50/60* | (2019.01) |

(52) U.S. Cl.
CPC ............... *B60L 53/62* (2019.02); *B60L 50/60* (2019.02); *H02M 3/155* (2013.01); *B60L 2210/10* (2013.01)

(58) Field of Classification Search
CPC .......... H02M 3/155; B60L 53/62; B60L 50/60
See application file for complete search history.

(56) References Cited

U.S. PATENT DOCUMENTS

| | | | |
|---|---|---|---|
| 4,408,270 A | 10/1983 | Anderson et al. | |
| 2001/0022472 A1 | 9/2001 | Codina et al. | |
| 2013/0326237 A1 | 12/2013 | Holdengreber et al. | |
| 2015/0380929 A1 | 12/2015 | Mitsutani | |
| 2016/0207418 A1* | 7/2016 | Bergstrom | B60G 3/08 |
| 2016/0261132 A1* | 9/2016 | Uan-Zo-Li | H02J 7/007 |
| 2017/0063150 A1* | 3/2017 | Sakamoto | H01M 10/425 |
| 2017/0088003 A1 | 3/2017 | Yu et al. | |
| 2017/0201107 A1* | 7/2017 | Yang | H02J 7/00 |
| 2018/0041048 A1* | 2/2018 | Yang | B60W 10/08 |
| 2018/0208137 A1* | 7/2018 | Yasunori | B60R 16/033 |
| 2018/0244221 A1* | 8/2018 | Ishihara | H01M 10/48 |
| 2021/0006076 A1 | 1/2021 | Rentel et al. | |

OTHER PUBLICATIONS

U.S. Appl. No. 16/563,693, filed Sep. 6, 2019, Smith.
U.S. Appl. No. 16/563,718, filed Sep. 6, 2019, Smith.
Official Action for U.S. Appl. No. 16/563,718, dated Jul. 26, 2021 13 pages.

* cited by examiner

*Primary Examiner* — Jared Fureman
*Assistant Examiner* — Esayas G Yeshaw
(74) *Attorney, Agent, or Firm* — Sheridan Ross P.C.

(57) ABSTRACT

A power supply device for a vehicle includes an energy storage device, and a converter coupled to an external power source and that converts a first voltage provided by the external power source into a second voltage. The power supply device includes at least one switching element coupled between the converter and the energy storage device, and a controller that monitors a charge level of the energy storage device while the vehicle is not in operation. The control controls switching of the at least one switching element based on the charge level to either i) connect the converter to the energy storage device to exit a sleep mode and enter a charge mode to charge the energy storage device with the second voltage, or ii) disconnect the converter from the energy storage device to exit the charge mode and enter the sleep mode.

19 Claims, 6 Drawing Sheets

VEHICLE POWER DEVICES, SYSTEMS, AND METHODS FOR SLEEP MODE

FIELD

The present disclosure is generally directed to vehicle systems, and more particularly to vehicle power systems.

BACKGROUND

Most vehicles, in particular electric and hybrid vehicles, include power systems that monitor and control the operation of the batteries within the vehicles. For example, a power system of an electric vehicle controls the vehicle's powertrain as well as loads or loads, such as heating and cooling components, dashboard electronics, etc. As the industry continues to develop, additional/alternative power systems are desired.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
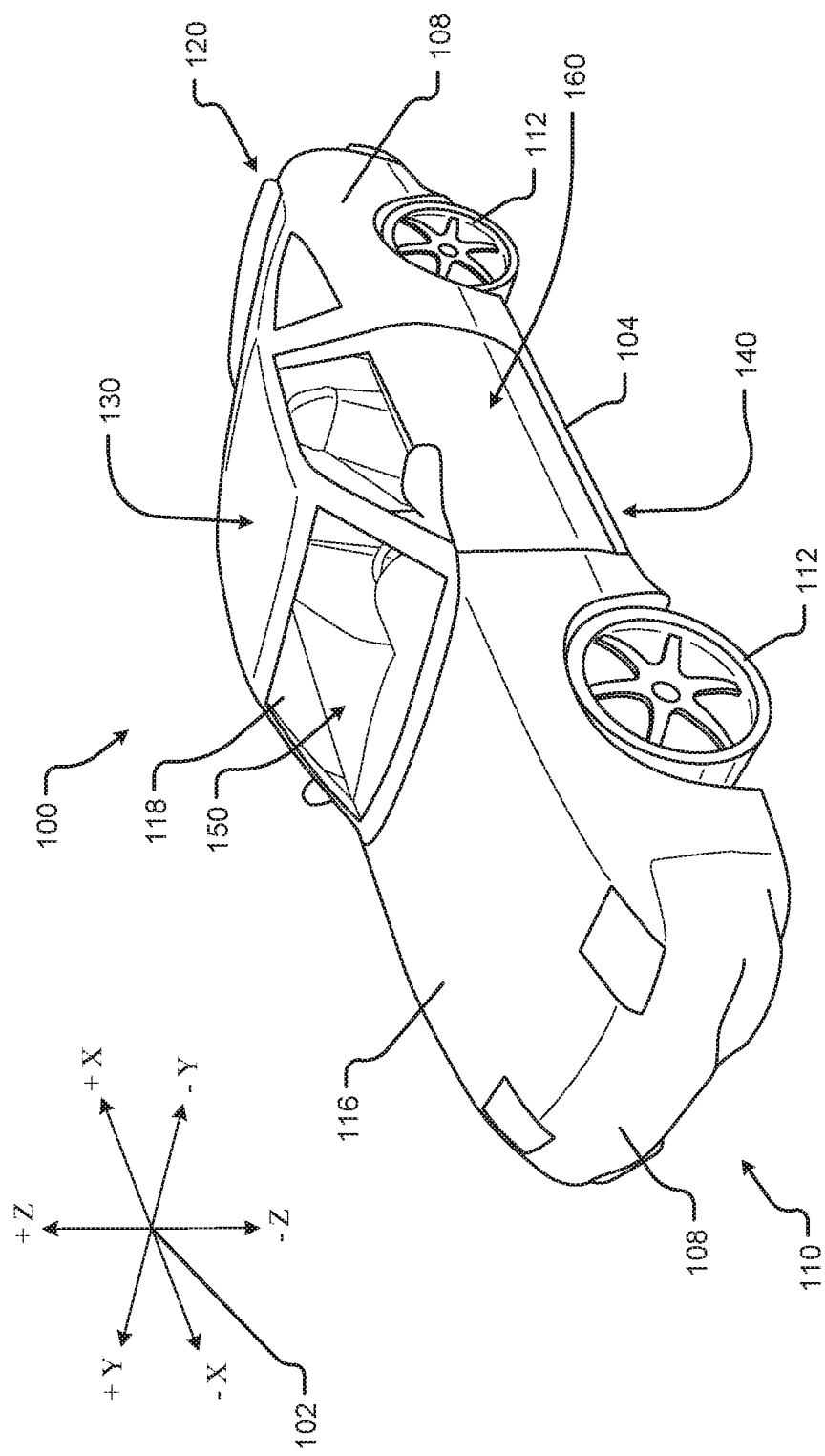
FIG. 1 shows a perspective view of a vehicle (or electric vehicle) in accordance with at least one example embodiment.

FIG. 1 shows a perspective view of a vehicle (or electric vehicle) 100 in accordance with example embodiments. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, a battery electric vehicle (BEV) or a hybrid electric vehicle (HEV). Where the vehicle 100 is BEV, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is an HEV, the vehicle 100 may comprise the above described elements of a BEV with the addition of a gas-powered (or diesel-powered) engine and associated components in the front compartment (under the vehicle hood 116), which engine may be configured to drive either or both of the front wheels 112 and the rear wheels 112. In some embodiments where the vehicle 100 is an HEV, the gas-powered engine and associated components may be located in a rear compartment of the vehicle 100, leaving the front compartment available for storage or trunk space or for other uses. In some embodiments, the vehicle 100 may be, in addition to a BEV and an HEV, a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

The vehicle 100 may be capable of autonomous operation, wherein one or more processors receive information from various sensors around the vehicle and use that information to control the speed and direction of the vehicle 100 so as to avoid hitting obstacles and to navigate safely from an origin to a destination. In such embodiments, a steering wheel is unnecessary, as the one or more processors, rather than a vehicle occupant, control the steering of the vehicle 100.

Figure 2:
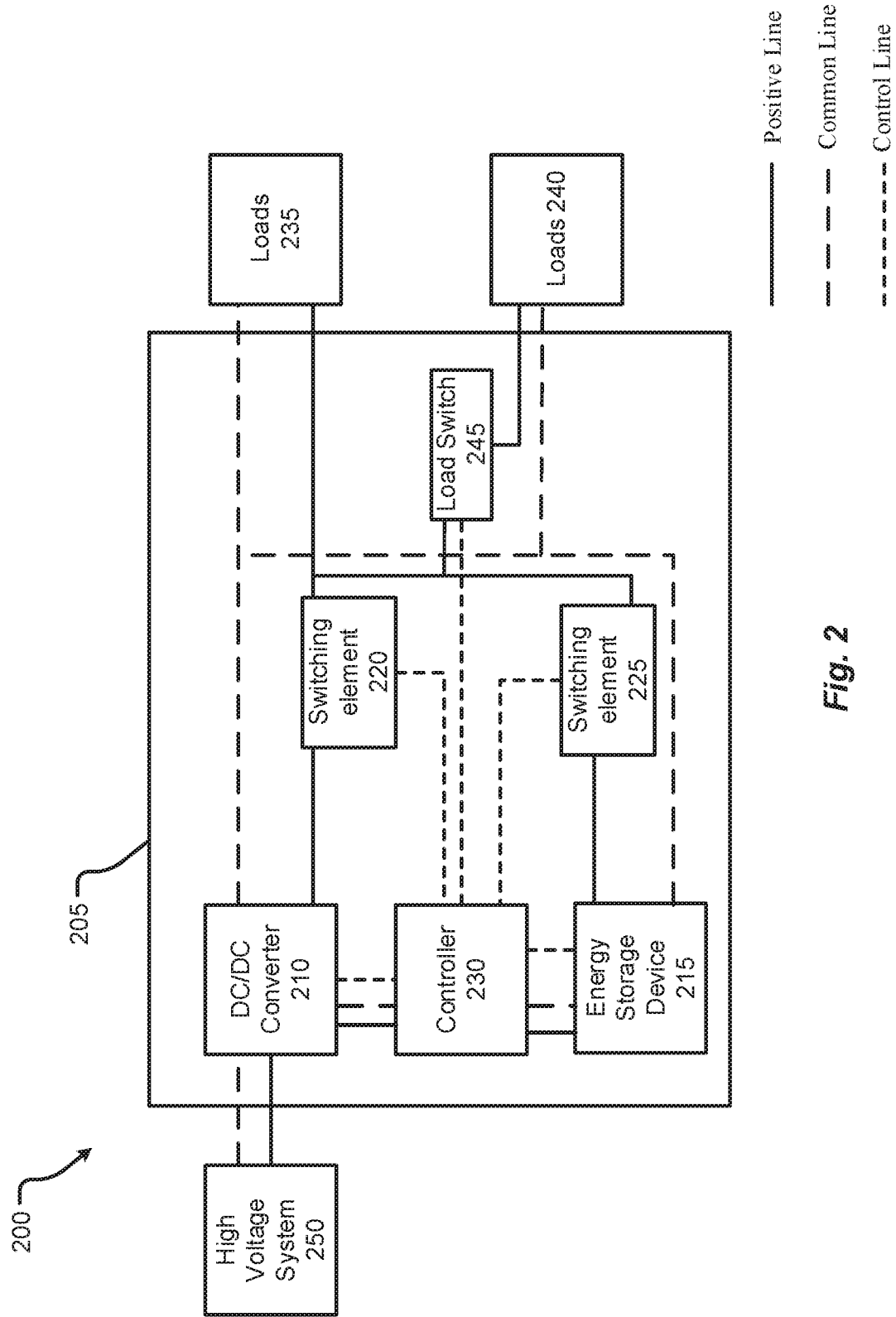
FIG. 2 is an example schematic of a power system of the vehicle in accordance with at least one example embodiment.

FIG. 2 is an example schematic of a power system 200 for the electric vehicle 100 in accordance with at least one example embodiment. The power system 200 includes a power supply device 205, a high voltage system (or external power source) 250, and first and second sets of load(s) 235/240. The power supply device 205 includes a converter 210, an energy storage device (or battery) 215, a first switching element 220, a second switching element 225, and a load switch 245. The power supply device 205 may be an uninterruptable power supply (UPS) device for providing an uninterrupted supply of power to the loads 235/240, for example. The UPS device may have various operating modes, described in more detail below with reference to FIGS. 4-6.

The converter 210 may be a direct current (DC) to DC converter for converting a DC voltage of the high voltage system 250 to a different (e.g., lower) DC voltage. The converted voltage may be a voltage for powering loads 235/240 (e.g., 12V). As shown, the converter 210 is coupled to the external power source 250 and converts a first voltage (e.g., 400V) provided by the external power source 250 into a second voltage (e.g., 12V).

The energy storage device 215 may include one or more rechargeable batteries or rechargeable battery cells that store electrical energy. For example, the energy storage device 215 may be a rechargeable 12V battery. In general, the energy storage device 215 and the converter 210 operate together to provide power to the loads 235 and/or 240 during normal vehicle operation. That is, the energy storage device 215 is usually connected to the loads 235 and/or 240, and may disconnect from the loads 325 and/or 240 in the event of a fault and/or over discharge condition. In this case, the energy storage device 215 may act as a power filter that helps filter and/or regulate an output of the converter 210. In some cases, the energy storage device 215 may continue to provide power to the loads 235 and/or 240 in the event of a failure of the external power source 250 and/or the converter 210, thereby providing an uninterrupted power supply to the loads 235 and/or 240.

Figure 3:
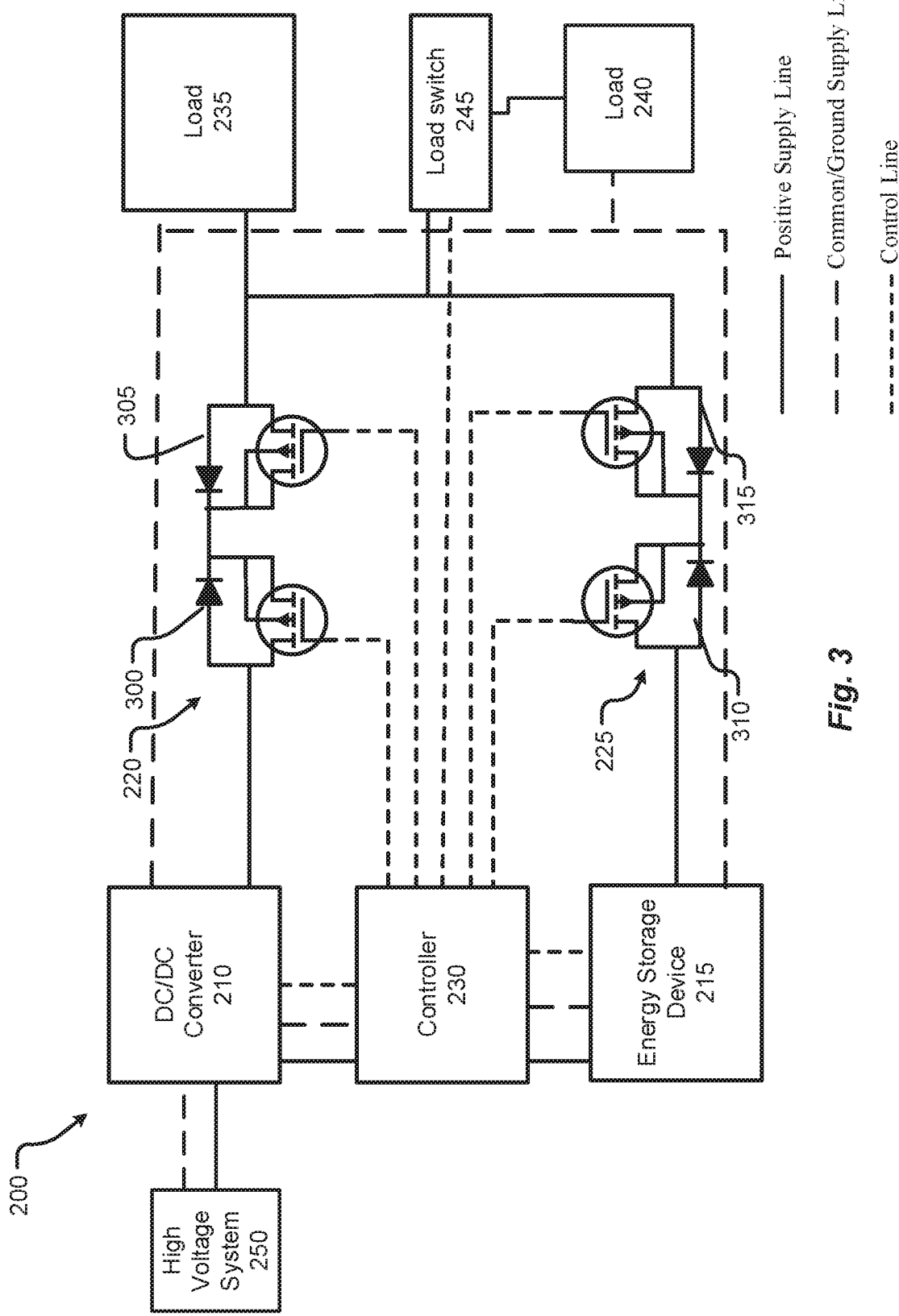
FIG. 3 is an example schematic of details of the power system of FIG. 2 in accordance with at least one example embodiment.

The switching elements 220 and 225 each include one or more switches to control the flow of current between the energy storage device 215 and the loads 235/240 as well as the flow of current between the converter 210 and the loads 235/240. As shown, the switching element 220 and the switching element 225 are coupled between the converter 210 and the energy storage device 215. FIG. 3 illustrates the switching elements 220 and 225 in more detail.

The controller 230 may include hardware and/or software for controlling operation of the power supply device 205. For example, the controller 230 may include a processor (e.g., a microprocessor) coupled to a memory (e.g., a non-volatile memory). The memory may include instructions that are executable by the processor to control the power supply device 205. Additionally or alternatively, the controller 230 may include an application specific integrated circuit (ASIC) with logic elements that control the power supply device 205. The controller 230 may control the power supply device 205 to operate in various modes. Operations of the controller 230 are discussed in more detail below with reference FIGS. 4-6.

The loads 235/240 may include interior and/or exterior electronic components of the vehicle 100. The load(s) 235 may include one or more electronic components that are desired to have a continuous power supply even in the event of a failure of the converter 210 and/or the external power source 250 (e.g., headlights, tail lights, etc.). The load(s) 240 may include one or more electronic components that are not necessarily desired to have a continuous power supply in the event of a failure of the converter 210 and/or the external power source 250 (e.g., radio controls, cabin lights, etc.). Whether an electronic component is included in the load 235 or the load 240 can be a design choice based on empirical evidence and/or preference.

The load switch 245 may include one or more switches to control the flow of current to the load 240.

The external power source 250 may power the vehicle 100 when the vehicle is in operation. For example, if the vehicle 100 is an electric vehicle, then the power source 250 may include one or more rechargeable battery packs (e.g., 400V, 800V, etc.) that power a drivetrain of the vehicle 100 to cause movement of the vehicle 100. During normal vehicle operation, the power provided by the power source 250 to the converter 210 is converted to a voltage (e.g., 12V) that drives the loads 235/240 and/or the controller 230.

The elements in FIG. 2 may be powered and controlled as shown by the solid line, long dashed line, and short dashed line. In FIG. 2, the solid line is a positive power supply line connected to positive terminals of each element, the long dashed line is a common/ground supply line connected to common/ground terminals of each element, and the short dashed line connected to control ports of each element.

FIG. 3 is an example schematic of the power system 200 from FIG. 2 with more detail in accordance with at least one example embodiment. As shown in FIG. 3, the switching element 220 may include a set of back-to-back switches 300 and 305. Likewise the switching element 225 may include a set of back-to-back switches 310 and 315. Each set of back-to-back switches may comprise PMOS transistors having body diodes and connected in a common source configuration. Each transistor 300/305/310/315 may be individually controllable by the controller 230. For example, as shown by the short dashed lines, each gate of each transistor 300/305/310/315 may be connected to a separate control port of the controller 230.

Although FIG. 3 illustrates the transistors as PMOS transistors, it should be understood that example embodiments may employ the use of NMOS transistors if desired and/or any other type of switch useful for power electronic applications that can have a back-to-back configuration.

Figure 4:
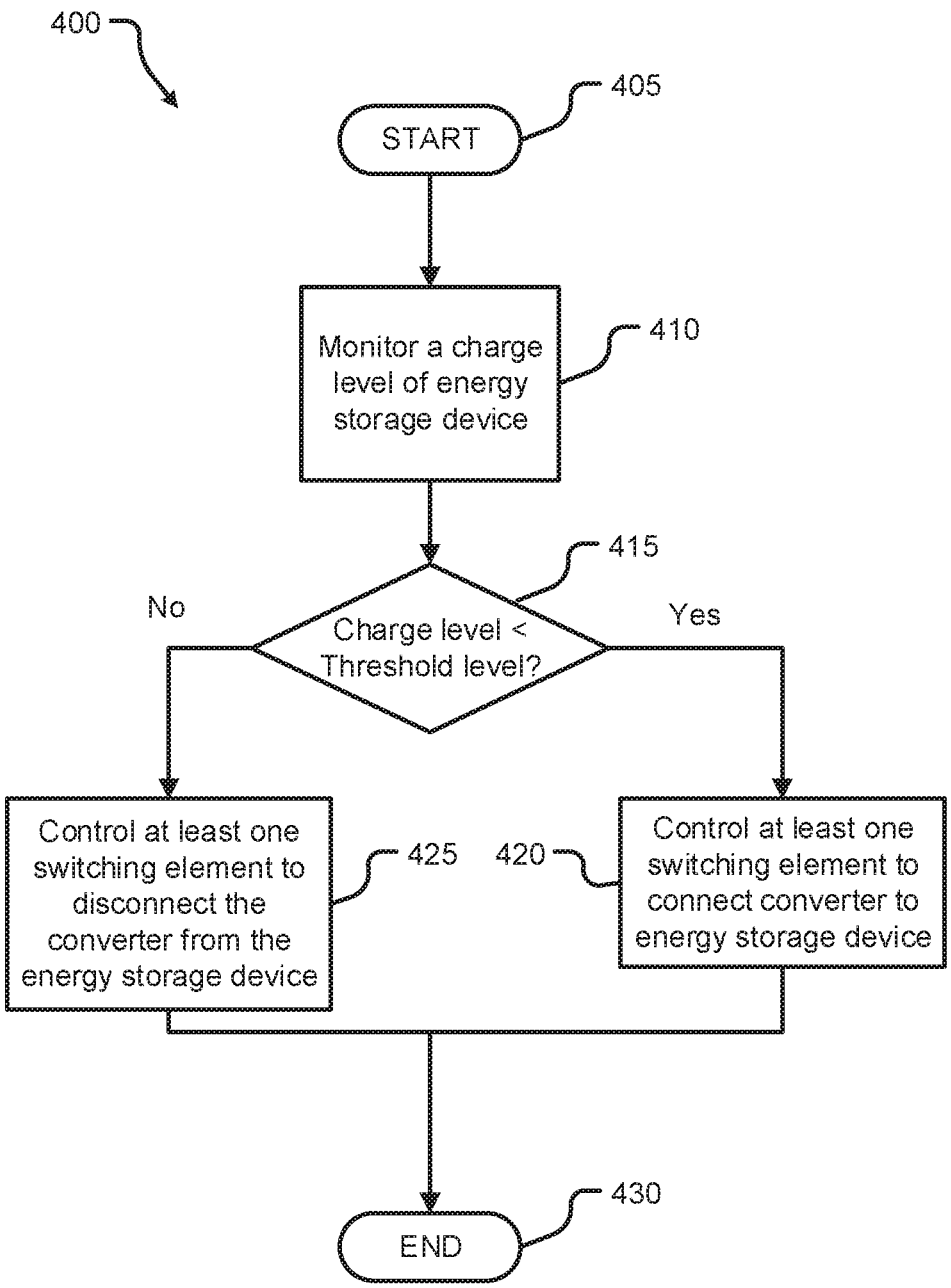
FIG. 4 is a flow diagram illustrating example operations of the system(s) in FIGS. 2-3 in accordance with at least one example embodiment.

FIG. 4 illustrates a method 400 according to at least one example embodiment. In more detail, FIG. 4 illustrates controlling the power supply device 205 to be in different modes, for example, a sleep mode and a charge mode.

While a general order for the steps of the method 400 is shown in FIG. 4, the method 400 can include more or fewer steps or can arrange the order of the steps differently than those shown in FIG. 4. Generally, the method 400 starts at operation 405 and ends at operation 430. The method 400 can be executed as a set of computer-executable instructions encoded or stored on a computer readable medium and executed by the controller 230. Alternatively, the operations discussed with respect to FIG. 4 may be implemented by the various elements of the system(s) FIGS. 1-3. Hereinafter, the method 400 shall be explained with reference to the systems, components, assemblies, devices, user interfaces, environments, software, etc. described in conjunction with FIGS. 1-3.

In operation 410, the method 400 monitors a charge level of the energy storage device 215 (e.g., a voltage level). According to at least one example embodiment, the charge level is monitored while the vehicle 100 is not in operation. For example, the method 400 monitors the charge level while all or most of the other electronic components (e.g., the loads 235/240, the powertrain, etc.) of the vehicle 100 are turned off or not in use (e.g., while the vehicle 100 is parked). In at least one other example embodiment, the charge level is also monitored while the vehicle 100 is in operation (e.g., while the vehicle is being driven). The method 400 may monitor the charge level using any known method for continuously measuring battery voltage.

In operation 415, the method 400 determines whether the charge level is less than a threshold level. The threshold level may be a design parameter set based on empirical evidence and/or preference. In at least one example embodiment, the threshold level is a minimum desired operating voltage one or more of the loads 235/240.

In operations 420 and 425, the method 400 controls switching of the at least one switching element based on the charge level to either i) connect the converter 210 to the energy storage device 215 to exit a sleep mode and enter a charge mode to charge the energy storage device 215 with the second voltage (e.g., with the converted voltage), or ii) disconnect the converter 210 from the energy storage device 215 to exit the charge mode and enter the sleep mode.

For example, in operation 420, the method 400 controls the switching of at least one switching element 220 and/or 225 to connect the converter 215 to the energy storage device 215 when the charge level is below a threshold level to charge the energy storage device 215.

In operation 425, the method 400 disables the converter 215 and controls the switching of the at least one switching element 220 and/or 225 to disconnect the converter 210 from the energy storage device 215 when the charge level is at or above the threshold level to enter the sleep mode. The converter 210 may be disabled by disconnecting the converter 210 from the external power source 250 via one or more switches (not shown) positioned between the converter 210 and the power source 250.

Here, it should be understood that example embodiments are not limited to performing the operations of FIG. 4 while the vehicle 100 is not in operation, but may alternatively or additionally be performed while the vehicle 100 is in operation (e.g., while being driven, autonomously or by a driver).

With reference to FIGS. 2-4, the at least one switching element includes a first switching element 220 and a second switching element 225 that are individually controllable by the controller 230. In at least one example embodiment, the first switching element 220 is coupled between the converter 210 and the second switching element 225, and the second switching element 225 is coupled between the first switching element 220 and the energy storage system 215. As shown in FIG. 3, the first switching element 220 includes a first set of back-to-back switches that are individually controllable by the controller 230 (e.g., by virtue of the gates of each transistor being tied to a separate output of the controller 230. Similarly, the second switching element 225 includes a second set of back-to-back switches that are individually controllable by the controller 230. Further, the first switching element 220 is coupled between the converter 210 and a first set of loads of the vehicle 235, and the controller 230 controls a connection of the converter 210 to the first set of loads 235 through the first switching element 220 (e.g., to cut-off power or supply power to the loads 235). As shown in FIGS. 2 and 3, a load switch 245 is coupled to the first switching element 220, the second switching element 225, and a second set of loads 240 of the vehicle 100. Here, the controller 230 controls a connection of the converter 210 to the second set of loads 240 through the first switching element 220 and the load switch 245. According to at least one example embodiment, the controller 230 controls a connection of the energy storage device 215 to the second set of loads 240 through the second switching element 225 and the load switch 245. For example, in the sleep mode, the controller 230 controls the load switch 245 to disconnect the second set of loads 240 from the first switching element 220 and the second switching element 225.

In view of FIGS. 2-4, it should be understood that at least one example embodiment is directed to a power system 200 for a vehicle 100. The power system 200 includes a power source 250 that powers the vehicle 100 with a first voltage (e.g., 400V, 800V, etc.) when the vehicle 100 is in operation (e.g., while moving). The power system 200 includes a power supply device 205 coupled to the power source 250. The power supply device 205 includes an energy storage device 215, and a converter 210 that converts the first voltage into a second voltage (e.g., 12V). The power supply device 205 includes at least one switching element coupled between the converter 210 and the energy storage device 215, and a controller 230 that monitors a charge level of the energy storage device 215 when the vehicle 100 is not in operation. The controller 230 controls switching of the at least one switching element based on the charge level to either i) connect the converter 210 to the energy storage device 215 to exit a sleep mode and enter a charge mode to charge the energy storage device 215 with the second voltage, or ii) disconnect the converter 210 from the energy storage device 215 to exit the charge mode and enter the sleep mode. The power supply device 205 performs the same or similar operations as those described above with respect to FIGS. 2-4.

At least one example embodiment is directed to a method for a vehicle 100. The method includes monitoring a charge level of an energy storage device 215 of the vehicle 100 when the vehicle 100 is not in operation, and controlling switching of at least one switching element based on the charge level to either i) connect a converter 210 to the energy storage device 215 to exit a sleep mode and enter a charge mode to charge the energy storage device 215 with a converted voltage, or ii) disconnect the converter 210 from the energy storage device 215 to exit the charge mode and enter the sleep mode.

Here, it should be appreciated that the method of FIG. 4 utilizes the integrated architecture of the power system 200 to monitor the charge level of the energy storage device 215 while the vehicle 100 and/or power system 200 is in an "off" state. In this reduced power state (or sleep mode), the power supply device 205 monitors the state of charge of the energy storage device 215 and when it reaches a desired minimum level, the power supply device 205 will then wake-up the powertrain controller to turn on the main traction battery and enable the DC/DC converter 215 from a common processor/microcontroller. The DC/DC converter 215 will then charge (in a charge mode) the energy storage device 215 up to a pre-determined threshold before turning off and sending the system back into a lower power sleep state. This is generally referred to as a periodic wake-up and charge or hibernation mode. Additionally, example embodiments can extend the duration of the sleep mode by opening the load switch 245 and therefore eliminating any sleep current from non-critical loads 240.

Figure 5:
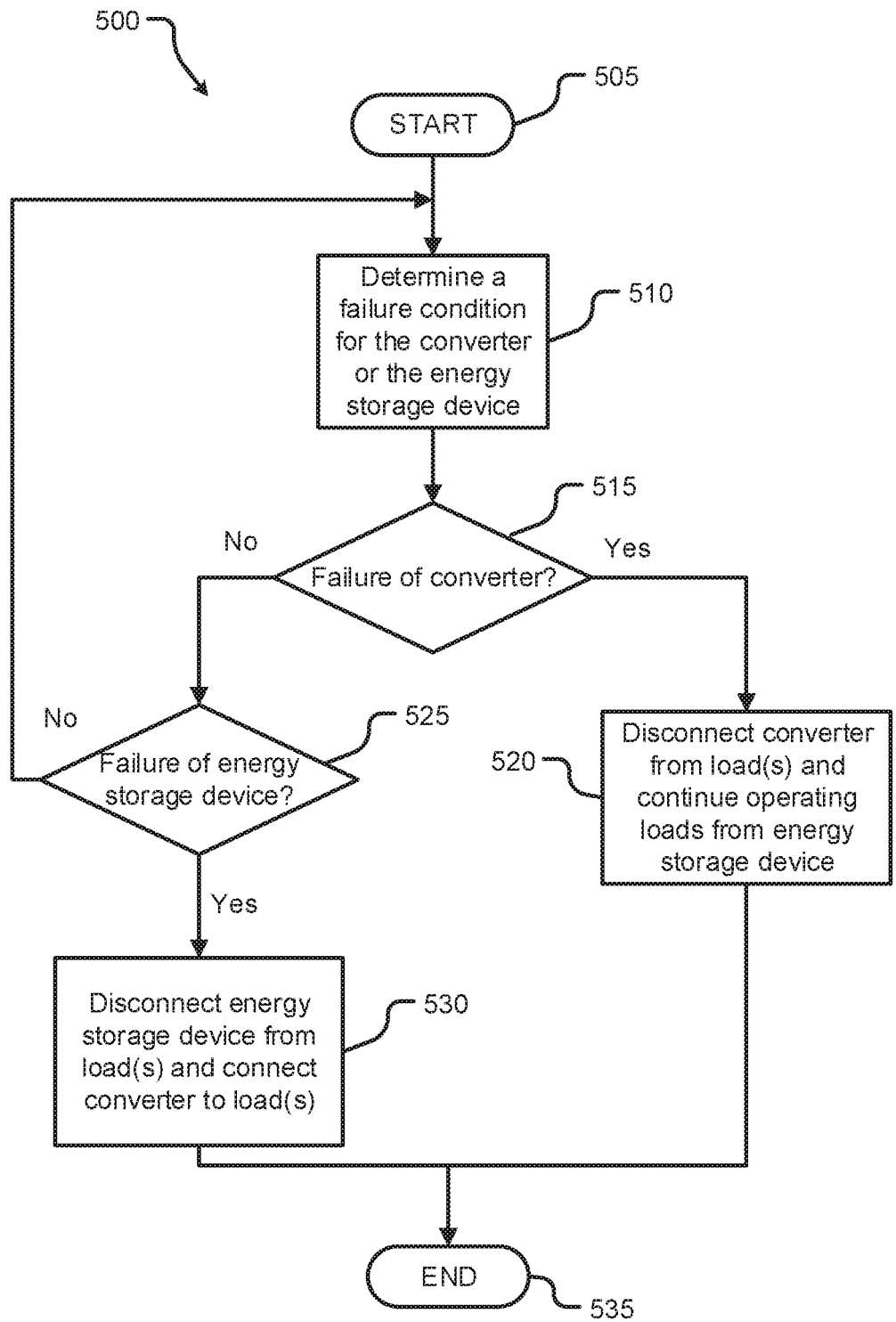
FIG. 5 is a flow diagram illustrating example operations of the system(s) in FIGS. 2-3 in accordance with at least one example embodiment.

FIG. 5 illustrates a method 500 according to at least one example embodiment. In more detail, FIG. 5 illustrates controlling the power supply device 205 in the event of a failure or simulated failure of the converter 210 and/or the energy storage device 215 in order to provide an uninterruptable power supply to loads 235 and/or 240.

While a general order for the steps of the method 500 is shown in FIG. 5, the method 500 can include more or fewer steps or can arrange the order of the steps differently than those shown in FIG. 5. Generally, the method 500 starts at operation 505 and ends at operation 535. The method 500 can be executed as a set of computer-executable instructions encoded or stored on a computer readable medium and executed by the controller 230. Alternatively, the operations discussed with respect to FIG. 5 may be implemented by the various elements of the system(s) FIGS. 1-3. Hereinafter, the method 500 shall be explained with reference to the systems, components, assemblies, devices, user interfaces, environments, software, etc. described in conjunction with FIGS. 1-4.

In operation 510, the method 500 determines a failure condition for the converter 210 or the energy storage device 215. The failure condition may be an actual failure or a simulated failure for the converter 210 and/or energy storage device 215. For example, in the event of an actual failure, the controller 230 may detect or receive an indication of a sudden voltage or current spike at outputs of the converter 210 and/or the energy storage device 215, and interpret the sudden change to mean that the converter 210 and/or the energy storage device 215 has failed. In at least one example embodiment, the controller 230 monitors outputs of the converter 210 and/or the energy storage device 215 and compares voltages at outputs of these components to desired thresholds that are associated with a likely or impending failure so as to avoid actual failure of the components.

In at least one example embodiment, a failure of the converter 210 and/or the energy storage device 215 is simulated, for example, by a technician in order to ensure that the power supply device 205 operates as intended. In this case, the simulated failure may be indicated to the controller 230 by an input to the controller 230 from the technician (e.g., via an on-board diagnostics (OBD) port of the vehicle 100). In other example embodiments, the controller 230 may be preprogrammed to periodically and automatically simulate the failures to ensure that the power supply device 205 will operate as intended in the event of an actual failure.

In response to determining the failure condition, the method 500 controls the first switching element 220 and the second switching element 225 such that i) the converter 210 is disconnected from or connected to the at least one set of loads 235/240, and ii) the energy storage device 215 is disconnected from or connected to the at least one set of loads 235/240.

For example, in operation 515, the method 500 includes determining whether the failure is of the converter 210. In operation 520 and in response to determining the failure condition for the converter 210 from operation 515, the method 500 i) controls the first switching element 220 to disconnect the converter 210 from the at least one set of loads 235/240, and ii) controls the second switching element 225 to maintain a connection of the energy storage device 215 to the at least one set of loads 235/240, so that power supplied to the at least one set of loads 235/240 is uninterrupted. In at least one example embodiment, operation 520 includes connecting loads 235 to the energy storage device 215 and disconnecting the loads 240 from energy storage device 215 via the load switch 245, which may extend the amount time for operating the loads 235. Here, the loads 235 may be considered critical to operating the vehicle 100 (e.g., the powertrain, headlights if at night) while the loads 240 are not considered critical to operating the vehicle (radio, HVAC components, etc.).

If the determining failure condition is not for the converter in operation 515, then the method 500 proceeds to operation 525 to determine whether the failure condition is for the energy storage device 215. If not, then the method 500 returns to operation 510 to continue monitoring the power supply device 205 for a failure or a simulated failure of the converter 210 and/or the energy storage device 215. If so, the method 500 proceeds to operation 530.

In operation 530 and in response to determining the failure condition for the energy storage device, the method 500 i) controls the second switching element 225 to disconnect the energy storage device 215 from the at least one set of loads 235/240, and ii) controls the first switching element 220 to connect the converter (if not already connected) 210 to the at least one set of loads 235/240, so that power supplied to the at least one set of loads 235/340 is uninterrupted. In at least one example embodiment, operation 530 performs only i) above, for example, if the converter 210 is already connected to the at least one set of loads 235/240.

In view of FIGS. 1-5, it should be understood that at least one example embodiment is directed to a power supply device 205 for a vehicle 100. The power supply device 205 includes an energy storage device 215 that supplies a first voltage (e.g., 12V), and a converter 210 coupled to an external power source 250 and that converts a second voltage (e.g., 400V, 800V, etc.) provided by the external power source 250 into the first voltage. The external power source 250 powers the vehicle 100 when the vehicle 100 is in operation. A first switching element 220 is coupled to the converter 210 and at least one set of loads 235/240 of the vehicle 100. The at least one set of loads 235/240 are powered by the first voltage when in operation. The power supply device includes a second switching element 225 coupled to the first switching element and the at least one set of loads 235/240. The power supply device 205 further includes a controller 230.

With reference to FIGS. 2-5, the at least one set of loads includes a first set of loads 235 and a second set of loads 240, where the first set of loads 235 and the second set of loads 240 have different power supply inputs. The load switch 245 is coupled between the first switching element 220 and the second set of loads 240. The load switch 245 is also coupled between the second switching element 225 and the second set of loads 240 of the vehicle 100. Here, operation 520 may include the method 500 controlling, in response to the detection of or the indication of the failure of the converter 210, the load switch 245 to disconnect a power supply input of the second set of auxiliary elements 240 from the energy storage device 215.

Here, it should be appreciated that the method of FIG. 5 utilizes the integrated architecture of the power supply device 205 to perform active self-test diagnostics in order to ensure that the fail operational capability is functional. For example, in order to perform the self-test, a common processor/microcontroller will disable/disconnect the DC/DC converter 210 to simulate a failure and therefore transfer the loads 235 and/or 240 to the energy storage device 215 backup to ensure it is operational. After testing the system 200 will return to its normal stage. Additionally or alternatively, the power supply device 205 can also actively disconnect the energy storage device 215 and transfer all the load to the DC/DC converter 210 to simulate an energy storage device 215 failure then transfer back to the full system. Further still, in a third option, the method can reduce the power capability of the DC/DC converter 215 so that the load is fully shared between the two components (215 and 210) to test the operational capabilities and assess the state of health of the devices 215 and 210. The method may assess the state of health of the devices 210/215 by measuring outputs of each device and comparing the measurements against thresholds associated with a healthy device.

Figure 6:
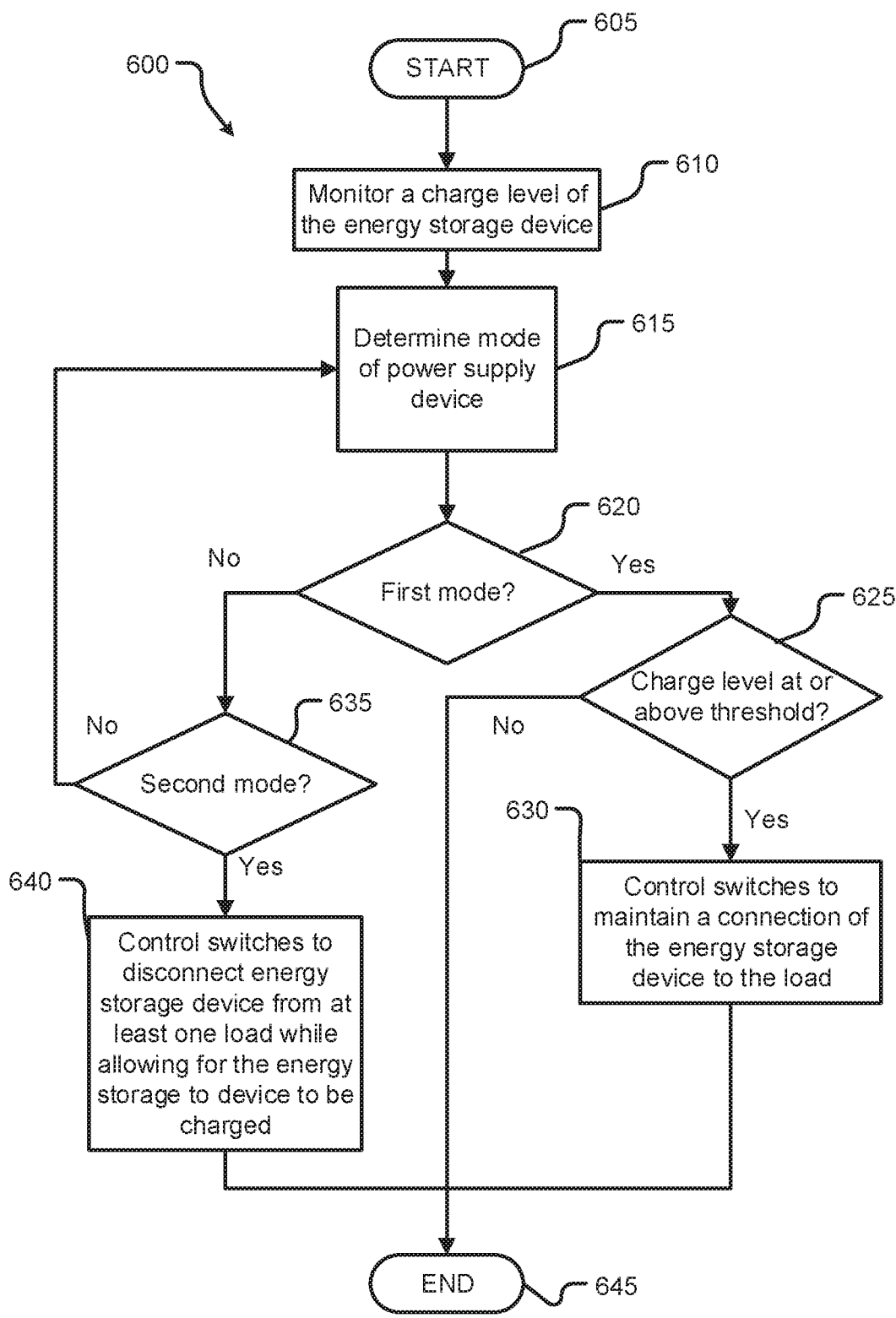
FIG. 6 is a flow diagram illustrating example operations of the system(s) in FIGS. 2-3 in accordance with at least one example embodiment.

FIG. 6 illustrates a method 600 according to at least one example embodiment. In more detail, FIG. 6 illustrates controlling the power supply device 205 in a manner that is based on a selected mode (e.g., pre-selected mode) of the power supply device 205 and a charge level of the energy storage device 215.

While a general order for the steps of the method 600 is shown in FIG. 6, the method 600 can include more or fewer steps or can arrange the order of the steps differently than those shown in FIG. 6. Generally, the method 600 starts at operation 605 and ends at operation 640. The method 600 can be executed as a set of computer-executable instructions encoded or stored on a computer readable medium and executed by the controller 230. Alternatively, the operations discussed with respect to FIG. 6 may be implemented by the various elements of the system(s) FIGS. 1-3. Hereinafter, the method 600 shall be explained with reference to the systems, components, assemblies, devices, user interfaces, environments, software, etc. described in conjunction with FIGS. 1-5.

In operation 610, the method 600 includes monitoring a charge level of the energy storage device 215 in a same or similar manner as described with respect to operation 410.

In operation 615, the method 600 determines a mode of the power supply device 205 as a first mode or a second mode. The first mode may be a mode in which the energy storage device 215 is desired to supply power to the at least one load 235/240. The second mode may be mode in which the energy storage device 215 is not desired to supply power to the at least one load 235/240. The mode may be determined based on a failure of the converter 210, a failure of the external power source 250, input from a passenger or driver of the vehicle 100, and/or other desired inputs or triggers.

The method 600 then controls, based on the charge level and the determined mode, a first set of back-to-back switches 220 to i) maintain a connection of the energy storage device 215 to the at least one load to supply power to the at least one load 235 and/or 240, or ii) disconnect the energy storage device 215 from the at least one load 235 and/or 240 while still allowing for the energy storage device 215 to be charged by a voltage provided by the converter 210 through the first set of back-to-back switches 220.

In operation 620, the method 600 determines whether the mode is the first mode. For example, the method 600 may determine the mode to be the first mode upon the controller 230 detecting a failure of the external power source 250, a failure of the converter 210, an input from a passenger or driver of the vehicle 100, a normal mode of operation in which the converter 210 and the energy storage device 215 are desired to supply power to the loads 235/240, and/or any other event that indicates a desire for the energy storage device 215 to supply power to the load 235 and/or the load 240.

If the mode is the first mode, the method 600 proceeds to operation 625 and determines whether the charge level of the energy storage device 215 is at or above a desired threshold. If not, the method 600 proceeds to operation 645 and ends, for example, after a desired amount of time or until the at least one load 235 and/or 240 is turned off. Alternatively, the method 600 could proceed to operation 640 to control the first set of back-to back switches 220 to disconnect the energy storage device 215 from the at least one load 235 and/or 240 while still allowing for the energy storage device 215 to be charged by the second voltage (i.e., the voltage supplied by the converter 210). Additionally or alternatively, the method 600 could proceed to an operation of providing an audio and/or visual notice (e.g., to the driver of the vehicle 100) to indicate that the energy storage device 215 does not have sufficient charge to allow the method to proceed to operation 630, and then proceed to operation 640. The threshold may be a design parameter set based on empirical evidence and/or preference. For example, the threshold may be a voltage level desired for supplying sufficient power to the at least one load 235 and/or 240, a voltage level associated with an overcharge condition of the energy storage device 215, and/or the like.

If, in operation 625, the charge level of the energy storage device 215 is determined to be at or above the threshold, the method 600 proceeds to operation 630 to control the second set of back-to-back switches 225 to maintain the connection of the energy storage device 215 to the at least one load 235 and/or 240.

If, in operation 620, the method 600 determines that the mode is not the first mode, the method 600 proceeds to operation 635 and to determine whether the mode is the second mode. If not, the method 600 returns to operation 615. If so, the method 600 proceeds to operation 640. The method 600 may determine that the mode is the second mode in operation 635 by detecting that the output of the converter 215 is sufficient to power the at least one load 235 and/or 240, detecting that a driver of the vehicle 100 has requested that the energy storage device 215 be charged, detecting that the energy storage device 215 is at or near an over discharge condition, and/or the like.

In operation 640, the method 600 controls the first set of back-to back switches 220 to disconnect the energy storage device 215 from the at least one load 235 and/or 240 while still allowing for the energy storage device 215 to be charged by the second voltage (i.e., the voltage supplied by the converter 210).

Subsequent to operation 640, the method ends at operation 645, for example, when the energy storage device 215 is sufficiently charged.

In view of FIGS. 2-6, it should be understood that at least one example embodiment is directed to a power supply device 205 including an energy storage device 215 having a first terminal. The power supply device 205 may include a first set of back-to-back switches 225 including a second terminal and a third terminal. The second terminal is coupled to the first terminal, and the third terminal is coupled to at least one load 235 and/or 240. The power supply device 205 includes a converter 215 that converts a first voltage received from an external power source 250 into a second voltage. The power supply device 205 includes a controller 230 that monitors a charge level of the energy storage device 215, determines a mode of the power supply device 205 as a first mode or a second mode, and controls, based on the charge level and the determined mode, the first set of back-to-back switches 225 to i) maintain a connection of the energy storage device to the at least one load to supply power to the at least one load, or ii) disconnect the energy storage device from the at least one load while still allowing for the energy storage device 215 to be charged by the second voltage through the first set of back-to-back switches 225. The first mode is a mode in which the energy storage device is desired to supply power to the at least one load 235 and/or 240, and the second mode is a mode in which the energy storage device is not desired to supply power to the at least one load 235 and/or 240.

For example, when the charge level is above a threshold level and the determined mode is the first mode, the controller 230 controls the first set of back-to-back switches 225 to maintain the connection of the energy storage device 215 to the at least one load 235 and/or 240. For example, the controller 230 controls the transistors 310 and 315 to be on.

In another example, when the charge level is at or below the threshold level or the determined mode is the second mode, the controller 230 controls the first set of back-to back switches 225 to disconnect the energy storage device 215 from the at least one load 235 and/or 240 while still allowing for the energy storage device 215 to be charged by the second voltage.

As shown in FIG. 3, the first set of back-to-back switches 225 includes first and second transistors 310/315 having first and second body diodes, respectively. The first transistor 310 is coupled to the first terminal of the energy storage device 215, and the second transistor 315 is coupled between the first transistor 310 and the third terminal of the at least one load 235 and/or 240.

In at least example embodiment where the power supply device 205 includes switching element 225 but not switching element 220, the controller 230 controls the second transistor 315 to be on and the first transistor 310 to be off to disconnect the energy storage device 215 from the at least one load 235 and/or 240 while still allowing for the energy storage device 215 to be charged by the second voltage.

The power supply device 205 may further include (e.g., optionally include) a second set of back-to-back switches 220 including a fourth terminal and a fifth terminal. As shown in FIG. 3, the fourth terminal is coupled to the converter 215, and the fifth terminal is coupled to the at least one load 235 and/or 240 and the third terminal of the first set of back-to-back switches 225. The second set of back-to-back switches 220 includes third and fourth transistors 300 and 205 having third and fourth body diodes, respectively. The third transistor 300 is coupled to the fourth terminal, and the fourth transistor 305 is coupled between the third transistor 300 and the fifth terminal.

In at least one example embodiment where the power supply device 205 includes both of the first and second back-to-back switches 220, the controller 230 controls the second transistor 315 to be on, the first transistor 310 to be off, the third transistor 300 to be on and the fourth transistor 305 to be on to disconnect the energy storage device from the at least one load 235 and/or 240 while still allowing for the energy storage device 215 to be charged by the second voltage.

Here, it should be appreciated that the method of FIG. 6 relates to the use of back-to-back switches for circuit protection of a battery. For example, in an over-discharge failure mode, the back-to-back switches provide a solution that allows the battery 215 to disconnect from loads 235 and/or 240 to prevent over-discharge but still allow current to flow in the direction that would be charging the battery 215 so that the battery 215 can recover from the over-discharge fault without damage. In this mode, example embodiments bring back the battery 215 from an overcharged state using a main output connection to the external source 250.

In view of FIGS. 1-6, it should be appreciated that the various described methods, devices, and systems may be combined with one another if desired. That is, the power systems of FIGS. 2 and 3 may be implemented to carry out one or more of the methods illustrated in FIGS. 4-6 in a same vehicle 100 if desired. Further, it should be understood that in one or more example embodiments, the converter 210 may be controlled to convert the voltage output by the energy storage device 215 to a voltage that matches the operating voltage of the high voltage system 250 in order to pre-charge a bus of the high voltage system 250 before closing contacts to other components of the high voltage system 250. This pre-charge operation may reduce the risk of damage to the components of the high voltage system 250 that may otherwise be caused by the inrush of current.

Although example embodiments have been discussed with reference to specific voltage/current values, it should be understood that example embodiments are not limited thereto. For example, example embodiments may also be applied to vehicle systems that charge/operate at different voltages/currents than those specifically referenced herein.

In addition, it should be understood that depending upon the application, either the switching element 220 or the switching element 225 could be omitted or bypassed within the power supply device 205 to accomplish a desired mode.

Example embodiments include a power supply device for a vehicle. The power supply device includes an energy storage device, and a converter coupled to an external power source and that converts a first voltage provided by the external power source into a second voltage. The external power source powers the vehicle when the vehicle is in operation. The power supply device includes at least one switching element coupled between the converter and the energy storage device, and a controller. The controller monitors a charge level of the energy storage device while the vehicle is not in operation, and controls switching of the at least one switching element based on the charge level to either i) connect the converter to the energy storage device to exit a sleep mode and enter a charge mode to charge the energy storage device with the second voltage, or ii) disconnect the converter from the energy storage device to exit the charge mode and enter the sleep mode.

Aspects of example embodiments include the controller controlling the switching of at least one switching element to connect the converter to the energy storage device when the charge level is below a threshold level to enter the charge mode to charge the energy storage device, and the controller disabling the converter and controls the switching of the at least one switching element to disconnect the converter from the energy storage device when the charge level is at or above the threshold level to enter the sleep mode.

Aspects of example embodiments include that the at least one switching element includes a first switching element and a second switching element that are individually controllable by the controller.

Aspects of example embodiments include that the first switching element is coupled between the converter and the second switching element, and the second switching element is coupled between the first switching element and the energy storage system.

Aspects of example embodiments include the first switching element includes a first set of back-to-back switches that are individually controllable by the controller.

Aspects of example embodiments include that the second switching element includes a second set of back-to-back switches that are individually controllable by the controller.

Aspects of example embodiments include that the first switching element is coupled between the converter and a first set of loads of the vehicle, and the controller controlling a connection of the converter to the first set of loads through the first switching element.

Aspects of example embodiments include a load switch coupled to the first switching element, the second switching element, and a second set of loads of the vehicle.

Aspects of example embodiments include that the controller controls a connection of the converter to the second set of loads through the first switching element and the load switch.

Aspects of example embodiments include that the controller controls a connection of the energy storage device to the second set of loads through the second switching element and the load switch, and, in the sleep mode, the controller controls the load switch to disconnect the second set of loads from the first switching element and the second switching element.

Aspects of example embodiments include that the first voltage is greater than the second voltage.

Example embodiments include a power system for a vehicle. The power system includes a power source that powers the vehicle with a first voltage when the vehicle is in operation, and a power supply device coupled to the power source. The power supply includes an energy storage device, a converter that converts the first voltage into a second voltage, at least one switching element coupled between the converter and the energy storage device, and a controller. The controller monitors a charge level of the energy storage device when the vehicle is not in operation, and controls switching of the at least one switching element based on the charge level to either i) connect the converter to the energy storage device to exit a sleep mode and enter a charge mode to charge the energy storage device with the second voltage, or ii) disconnect the converter from the energy storage device to exit the charge mode and enter the sleep mode.

Aspects of example embodiments include that the controller controls the switching of at least one switching element to connect the converter to the energy storage device when the charge level is below a threshold level to charge the energy storage device, and that the controller disables the converter and controls the switching of the at least one switching element to disconnect the converter from the energy storage device when the charge level is at or above the threshold level.

Aspects of example embodiments include that the at least one switching element includes a first switching element and a second switching element that are individually controllable by the controller.

Aspects of example embodiments include that the first switching element is coupled between the converter and the second switching element, and that the second switching element is coupled between the first switching element and the energy storage system.

Aspects of example embodiments include that the first switching element includes a first set of back-to-back switches that are individually controllable by the controller, and that the second switching element includes a second set of back-to-back switches that are individually controllable by the controller.

Aspects of example embodiments include a first set of loads. The power supply device further includes a load switch coupled to the first switching element, the second switching element, and the first set of loads of the vehicle, and, in the sleep mode, the controller controls the load switch to disconnect the first set of loads from the first switching element and the second switching element.

Aspects of example embodiments include that the controller controls a connection of the converter to the first set of loads through the first switching element and the load switch, and that the controller controls a connection of the energy storage device to the first set of loads through second switching element and the load switch.

Aspects of example embodiments include a second set of loads. The first switching element is coupled between the converter and the second set of loads of the vehicle, and the controller controls a connection of the converter to the second set of loads through the first switching element.

Example embodiments include a method for a vehicle. The method includes monitoring a charge level of an energy storage device of the vehicle when the vehicle is not in operation, and controlling switching of at least one switching element based on the charge level to either i) connect a converter to the energy storage device to exit a sleep mode and enter a charge mode to charge the energy storage device with a converted voltage, or ii) disconnect the converter from the energy storage device to exit the charge mode and enter the sleep mode.

Example embodiments include a power supply device for a vehicle. The power supply device includes an energy storage device that supplies a first voltage, and a converter coupled to an external power source and that converts a second voltage provided by the external power source into the first voltage. The external power source powers the vehicle when the vehicle is in operation. The power supply device includes a first switching element coupled to the converter and at least one load of the vehicle. The at least one load is powered by the first voltage when in operation. The power supply device includes a second switching element coupled to the first switching element and the at least one load. The power supply device includes a controller that determines a failure condition for the converter or the energy storage device, and controls, in response to determining the failure condition, the first switching element and the second switching element such that i) the converter is disconnected from or connected to the at least one load, and ii) the energy storage device is disconnected from or connected to the at least one load.

Aspects of example embodiments include that the controller, in response to determining the failure condition for the converter, i) controls the first switching element to disconnect the converter from the at least one load, and ii) controls the second switching element to maintain a connection of the energy storage device to the at least one load, so that power supplied to the at least one load is uninterrupted.

Aspects of example embodiments include that the controller, in response to determining the failure condition for the energy storage device, i) controls the second switching element to disconnect the energy storage device from the at least one load, and ii) controls the first switching element to connect the converter to the at least one load, so that power supplied to the at least one load is uninterrupted.

Aspects of example embodiments include that the first switching element includes a first set of back-to-back switches that are individually controllable by the controller.

Aspects of example embodiments include that the second switching element includes a second set of back-to-back switches that are individually controllable by the controller.

Aspects of example embodiments include that the at least one load includes a first load and a second load, and that the first load and the second load have different power supply inputs.

Aspects of example embodiments include a load switch coupled between the first switching element and the second load, and coupled between the second switching element and the second load of the vehicle.

Aspects of example embodiments include that the controller controls, in response to the detection of or the indication of the failure of the converter, the load switch to disconnect a power supply input of the second load from the energy storage device.

Aspects of example embodiments include that the first voltage is less than the second voltage. The failure condition includes an actual failure or a simulated failure of the converter or the energy storage device.

Example embodiments include a power system for a vehicle. The power system includes a power source that powers the vehicle according to a first voltage when the vehicle is in operation, at least one load, and a power supply device coupled to the power source. The power supply device includes an energy storage device that supplies a second voltage. The second voltage powers the at least one load when in operation. The power supply device includes a converter that converts the first voltage into the second voltage, and a first switching element coupled to the converter and the at least one load. The power supply device includes a second switching element coupled to the first switching element and the at least one load. The power supply device includes a controller that determines a failure condition for the converter or the energy storage device, and controls, in response to determining the failure condition, the first switching element and the second switching element such that i) the converter is disconnected from or connected to the at least one load, and ii) the energy storage device is disconnected from or connected to the at least one load.

Aspects of example embodiments include that the controller, in response determining the failure condition for the energy storage device, i) controls the second switching element to disconnect the energy storage device from the at least one load, and ii) controls the first switching element to connect the converter to the at least one load, so that power supplied to the at least one load is uninterrupted.

Aspects of example embodiments include that the controller, in response to determining the failure condition for the converter, i) controls the first switching element to disconnect the converter from the at least one load, and ii) controls the second switching element to maintain a connection of the energy storage device to the at least one load, so that power supplied to the at least one load is uninterrupted.

Aspects of example embodiments include that the first switching element includes a first set of back-to-back switches that are individually controllable by the controller.

Aspects of example embodiments include that the second switching element includes a second set of back-to-back switches that are individually controllable by the controller.

Aspects of example embodiments include that the at least one load includes a first load and a second load, and that the first load and the second load have different power supply inputs.

Aspects of example embodiments include a load switch coupled between the first switching element and the second load, and coupled between the second switching element and the second load of the vehicle.

Aspects of example embodiments include that the controller controls, in response to determining the failure condition for the converter, the load switch to disconnect a power supply input of the second load from the energy storage device.

Aspects of example embodiments include that the first voltage is less than the second voltage.

Example embodiments include a method for a power supply device of a vehicle. The method includes determining a failure condition for a converter of the power supply device or an energy storage device of the power supply device. The method includes controlling, in response to determining the failure condition, a first switching element of the power supply device and a second switching element of the power supply device such that i) the converter is disconnected from or connected to at least one load of the power supply device, and ii) the energy storage device is disconnected from or connected to the at least one load.

Aspects of example embodiments include that the controlling, in response to determining that the failure condition is for the energy storage device, i) controls the second switching element to disconnect the energy storage device from the at least one load, and ii) controls the first switching element to connect the converter to the at least one load, so that power supplied to the at least one load is uninterrupted. The controlling, in response to determining that the failure condition is for the converter, i) controls the first switching element to disconnect the converter from the at least one load, and ii) controls the second switching element to maintain a connection of the energy storage device to the at least one load, so that power supplied to the at least one load is uninterrupted.

Example embodiments include a power supply device. The power supply device includes an energy storage device including a first terminal, and a first set of back-to-back switches including a second terminal and a third terminal. The second terminal is coupled to the first terminal, and the third terminal is coupled to at least one load. The power supply device includes a converter that converts a first voltage received from an external power source into a second voltage, and a controller that. The controller monitors a charge level of the energy storage device, and determines a mode of the power supply device as a first mode or a second mode. The first mode is a mode in which the energy storage device is desired to supply power to the at least one load, and the second mode is a mode in which the energy storage device is not desired to supply power to the at least one load. The controller controls, based on the charge level and the determined mode, the first set of back-to-back switches to i) maintain a connection of the energy storage device to the at least one load to supply power to the at least one load, or ii) disconnect the energy storage device from the at least one load while still allowing for the energy storage device to be charged by the second voltage through the first set of back-to-back switches.

Aspects of example embodiments include that when the charge level is above a threshold level and the determined mode is the first mode, the controller controls the first set of back-to-back switches to maintain the connection of the energy storage device to the at least one load.

Aspects of example embodiments include that when the charge level is at or below the threshold level or the determined mode is the second mode, the controller controls the first set of back-to back switches to disconnect the energy storage device from the at least one load while still allowing for the energy storage device to be charged by the second voltage.

Aspects of example embodiments include that the first set of back-to-back switches includes first and second transistors having first and second body diodes, respectively. The first transistor is coupled to the first terminal, and the second transistor is coupled between the first transistor and the third terminal.

Aspects of example embodiments include that the controller controls the first transistor to be off and the second transistor to be on to disconnect the energy storage device from the at least one load while still allowing for the energy storage device to be charged by the second voltage.

Aspects of example embodiments include a second set of back-to-back switches including a fourth terminal and a fifth terminal. The fourth terminal is coupled to the converter, and the fifth terminal is coupled to the at least one load and the third terminal.

Aspects of example embodiments include that the second set of back-to-back switches includes third and fourth transistors having third and fourth body diodes, respectively. The third transistor is coupled to the fourth terminal, and the fourth transistor is coupled between the third transistor and the fifth terminal.

Aspects of example embodiments include the controller controls the third transistor to be on and the fourth transistor to be on to disconnect the energy storage device from the at least one load while still allowing for the energy storage device to be charged by the second voltage.

Example embodiments include a power supply system. The power supply system includes a power source that supplies a first voltage, and a power supply device that supplies power to at least one load at a second voltage. The power supply device includes an energy storage device including a first terminal, and a first set of back-to-back switches including a second terminal and a third terminal. The second terminal is coupled to the first terminal, and the third terminal is coupled to the at least one load. The power supply device includes a converter that converts the first voltage into the second voltage, and a controller that monitors a charge level of the energy storage device. The controller determines a mode of the power supply device as a first mode or a second mode. The first mode is a mode in which the energy storage device is desired to supply power to the at least one load, and the second mode is a mode in which the energy storage device is not desired to supply power to the at least one load. The controller controls, based on the charge level the determined mode, the first set of back-to-back switches to i) maintain a connection of the energy storage device to the at least one load to supply power to the at least one load, or ii) disconnect the energy storage device from the at least one load while still allowing for the energy storage device to be charged by the second voltage through the first set of back-to-back switches.

Aspects of example embodiments include that when the charge level is above a threshold level and the determined mode is the first mode, the controller controls the first set of back-to-back switches to maintain the connection of the energy storage device to the at least one load.

Aspects of example embodiments include that when the charge level is at or below the threshold level or the determined mode is the second mode, the controller controls the first set of back-to back switches to disconnect the energy storage device from the at least one load while still allowing for the energy storage device to be charged by the second voltage.

Aspects of example embodiments include that the first set of back-to-back switches includes first and second transistors having first and second body diodes, respectively. The first transistor is coupled to the first terminal, and the second transistor is coupled between the first transistor and the third terminal.

Aspects of example embodiments include that the controller controls the first transistor to be off and the second transistor to be on to disconnect the energy storage device from the at least one load while still allowing for the energy storage device to be charged by the second voltage.

Aspects of example embodiments include a second set of back-to-back switches including a fourth terminal and a fifth terminal. The fourth terminal is coupled to the converter, and the fifth terminal is coupled to the at least one load and the third terminal.

Aspects of example embodiments include that the second set of back-to-back switches includes third and fourth transistors having third and fourth body diodes, respectively. The third transistor is coupled to the fourth terminal, and the fourth transistor is coupled between the third transistor and the fifth terminal.

Aspects of example embodiments include that the controller controls the third transistor to be on and the fourth transistor to be on to disconnect the energy storage device from the at least one load while still allowing for the energy storage device to be charged by the second voltage.

Example embodiments include a method for controlling a power supply device. The method includes monitoring a charge level of an energy storage device, and determining a mode of the power supply device as a first mode or a second mode. The first mode is a mode in which the energy storage device is desired to supply power to at least one load, and the second mode is a mode in which the energy storage device is not desired to supply power to the at least one load. The method includes controlling, based on the charge level the determined mode, a first set of back-to-back switches of the power supply device to i) maintain a connection of the energy storage device to the at least one load to supply power to the at least one load, or ii) disconnect the energy storage device from the at least one load while still allowing for the energy storage device to be charged by an external power source through the first set of back-to-back switches.

Aspects of example embodiments include that the first set of back-to-back switches includes first and second transistors. The first transistor is coupled to the energy storage device, and the second transistor is coupled between the first transistor and a converter that converts a first voltage of the external power source into a second voltage.

Aspects of example embodiments include that when the charge level is at or below a threshold level or the determined mode is the second mode, the controlling controls the first and second and transistors to disconnect the energy storage device from the at least one load while still allowing for the energy storage device to be charged by the second voltage by controlling the first transistor to be off and the second transistor to be on.

Aspects of example embodiments include that the power supply device further comprises a second set of back-to-back switches including third and fourth transistors. The third transistor is coupled to the converter, the fourth transistor is coupled between the third transistor and the second transistor, and the controlling controls the third transistor to be on and the fourth transistor to be on to disconnect the energy storage device from the at least one load while still allowing for the energy storage device to be charged by the second voltage.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized.

The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A power supply device for a vehicle, comprising:
   an energy storage device;
   a converter coupled to a power source of the vehicle and that converts a first voltage provided by the power source into a second voltage, the power source providing power to a powertrain that moves the vehicle when the vehicle is in operation;
   at least one switching element coupled between the converter and the energy storage device; and
   a controller that:
      monitors a charge level of the energy storage device while the vehicle is not in operation; and
      controls, while the vehicle is not in operation, switching of the at least one switching element based on the charge level to either i) connect the converter to the energy storage device to exit a sleep mode and enter a charge mode to charge the energy storage device with a second voltage output from the converter as a result of the converter converting the first voltage from the power source, or ii) disconnect the converter from the energy storage device to exit the charge mode and enter the sleep mode.

2. The power supply device of claim 1, wherein the controller controls the switching of at least one switching element to connect the converter to the energy storage device when the charge level is below a threshold level to enter the charge mode to charge the energy storage device, and wherein the controller disables the converter and controls the switching of the at least one switching element to disconnect the converter from the energy storage device when the charge level is at or above the threshold level to enter the sleep mode.

3. The power supply device of claim 1, wherein the at least one switching element includes a first switching element and a second switching element that are individually controllable by the controller.

4. The power supply device of claim 3, wherein the first switching element is coupled between the converter and the second switching element, and wherein the second switching element is coupled between the first switching element and the energy storage device.

5. The power supply device of claim 4, wherein the first switching element includes a first set of back-to-back switches that are individually controllable by the controller.

6. The power supply device of claim 5, wherein the second switching element includes a second set of back-to-back switches that are individually controllable by the controller.

7. The power supply device of claim 3, wherein the first switching element is coupled between the converter and a first set of loads of the vehicle, and wherein the controller controls a connection of the converter to the first set of loads through the first switching element.

8. The power supply device of claim 7, further comprising:
   a load switch coupled to the first switching element, the second switching element, and a second set of loads of the vehicle.

9. The power supply device of claim 8, wherein the controller controls a connection of the converter to the second set of loads through the first switching element and the load switch.

10. The power supply device of claim 9, wherein the controller controls a connection of the energy storage device to the second set of loads through the second switching element and the load switch, and wherein, in the sleep mode, the controller controls the load switch to disconnect the second set of loads from the first switching element and the second switching element.

11. The power supply device of claim 1, wherein the first voltage is greater than the second voltage.

12. A power system for a vehicle, comprising:
   a power source that powers the vehicle with a first voltage when the vehicle is in operation; and
   a power supply device coupled to the power source, the power supply device including:
      an energy storage device;
      a converter that converts the first voltage into a second voltage;
      at least one switching element coupled between the converter and the energy storage device; and
      a controller that:
         monitors a charge level of the energy storage device when the vehicle is not in operation; and
         controls switching of the at least one switching element based on the charge level to either i) connect the converter to the energy storage device to exit a sleep mode and enter a charge mode to charge the energy storage device with the second voltage, or ii) disconnect the converter from the energy storage device to exit the charge mode and enter the sleep mode,
   wherein the at least one switching element includes a first switching element and a second switching element, wherein the first switching element is coupled between the converter and the second switching element, and wherein the first switching element includes a first set of back-to-back switches that are individually controllable by the controller.

13. The power system of claim 12, wherein the controller controls the switching of at least one switching element to connect the converter to the energy storage device when the charge level is below a threshold level to charge the energy storage device, and wherein the controller disables the converter and controls the switching of the at least one switching element to disconnect the converter from the energy storage device when the charge level is at or above the threshold level.

14. The power system of claim 12, wherein the second switching element is coupled between the first switching element and the energy storage device.

15. The power system of claim 14, wherein the second switching element includes a second set of back-to-back switches that are individually controllable by the controller.

16. The power system of claim 14, further comprising:

a first set of loads, wherein the power supply device further includes a load switch coupled to the first switching element, the second switching element, and the first set of loads of the vehicle, and wherein, in the sleep mode, the controller controls the load switch to disconnect the first set of loads from the first switching element and the second switching element.

17. The power system of claim 16, wherein the controller controls a connection of the converter to the first set of loads through the first switching element and the load switch, and wherein the controller controls a connection of the energy storage device to the first set of loads through the second switching element and the load switch.

18. The power system of claim 16, further comprising:

a second set of loads, wherein the first switching element is coupled between the converter and the second set of loads of the vehicle, and wherein the controller controls a connection of the converter to the second set of loads through the first switching element.

19. A method for a vehicle, comprising:

monitoring a charge level of an energy storage device of the vehicle when the vehicle is not in operation; and controlling, while the vehicle is not in operation, switching of at least one switching element based on the charge level to either i) connect a converter to the energy storage device to exit a sleep mode and enter a charge mode to charge the energy storage device with a converted voltage output from the converter as a result of the converter converting a voltage from a power source providing power to a powertrain that moves the vehicle when the vehicle is in operation, or ii) disconnect the converter from the energy storage device to exit the charge mode and enter the sleep mode.

* * * * *